United States Patent
Wong et al.

(10) Patent No.: US 7,440,962 B1
(45) Date of Patent: Oct. 21, 2008

(54) METHOD AND SYSTEM FOR MANAGEMENT OF ACCESS INFORMATION

(75) Inventors: Daniel ManHung Wong, South San Francisco, CA (US); Nina Lewis, San Mateo, CA (US); Chon Hei Lei, San Leandro, CA (US)

(73) Assignee: Oracle International Corporation, Redwood Shores, CA (US)

( * ) Notice: Subject to any disclaimer, the term of this patent is extended or adjusted under 35 U.S.C. 154(b) by 135 days.

(21) Appl. No.: 09/974,085

(22) Filed: Oct. 9, 2001

Related U.S. Application Data (60) Provisional application No. 60/272,521, filed on Feb. 28, 2001.

(51) Int. Cl.
*G06F 17/00* (2006.01)

(52) U.S. Cl. .................. 707/102; 707/100; 707/101

(58) Field of Classification Search .............. 707/10, 707/102, 104.1, 1, 3, 100, 101; 709/200–201
See application file for complete search history.

(56) References Cited

U.S. PATENT DOCUMENTS

| | | | |
|---|---|---|---|
| 5,450,581 A | 9/1995 | Bergen et al. | |
| 5,684,951 A | 11/1997 | Goldman et al. | |
| 5,708,812 A | 1/1998 | Van Dyke et al. | |
| 5,768,519 A | 6/1998 | Swift et al. | |
| 5,884,316 A | 3/1999 | Bernstein et al. | |
| 5,899,987 A | 5/1999 | Yarom | |
| 6,119,230 A | 9/2000 | Carter | |
| 6,145,086 A | 11/2000 | Bellemore et al. | |
| 6,158,010 A | 12/2000 | Moriconi et al. | |
| 6,178,511 B1 | 1/2001 | Cohen et al. | |
| 6,192,130 B1 | 2/2001 | Otway | |
| 6,240,512 B1 | 5/2001 | Fang et al. | |
| 6,243,816 B1 | 6/2001 | Fang et al. | |
| 6,253,216 B1 * | 6/2001 | Sutcliffe et al. | 715/500 |
| 6,275,944 B1 | 8/2001 | Kao et al. | |
| 6,289,462 B1 | 9/2001 | McNabb et al. | |
| 6,321,259 B1 * | 11/2001 | Ouellette et al. | 709/220 |
| 6,339,423 B1 | 1/2002 | Sampson et al. | |
| 6,377,950 B1 * | 4/2002 | Peters et al. | 707/10 |
| 6,385,724 B1 | 5/2002 | Beckman et al. | |
| 6,490,591 B1 * | 12/2002 | Denbar et al. | 707/101 |
| 6,507,817 B1 * | 1/2003 | Wolfe et al. | 704/260 |
| 6,535,879 B1 | 3/2003 | Behera | |
| 6,556,995 B1 | 4/2003 | Child et al. | |
| 6,651,168 B1 | 11/2003 | Kao et al. | |

(Continued)

OTHER PUBLICATIONS

How to use ADSI to set LDAP Directory Attributes, Microsoft 2000 Standard Edition.*

(Continued)

*Primary Examiner*—Sana Al-Hashemi
(74) *Attorney, Agent, or Firm*—Vista IP Law Group LLP (57) ABSTRACT

An improved method and system for centrally managing and accessing attribute information in a distributed computing system is disclosed. Applications set up application specific user attributes in a directory. When an application user connects to a server, the server automatically accesses the directory to identify the relevant user attributes for that application. These user attributes are retrieved and stored in the session context. Standard LDAP attributes can also be retrieved from the directory and stored in the session context.

51 Claims, 9 Drawing Sheets

U.S. PATENT DOCUMENTS

| | | | |
|---|---|---|---|
| 6,678,682 | B1 | 1/2004 | Jenkins et al. |
| 6,768,988 | B2 * | 7/2004 | Boreham et al. ............... 707/3 |
| 2002/0007346 | A1 | 1/2002 | Qiu et al. |
| 2002/0026592 | A1 | 2/2002 | Gavrila et al. |
| 2002/0069223 | A1 | 6/2002 | Goodisman et al. |
| 2002/0078004 | A1 | 6/2002 | Ambrosini et al. |
| 2002/0082818 | A1 | 6/2002 | Ferguson et al. |
| 2002/0083073 | A1 * | 6/2002 | Vaidya et al. ............... 707/102 |
| 2003/0195888 | A1 | 10/2003 | Croft et al. |

OTHER PUBLICATIONS

Configuring LDAP the Apache Software Foundation 2003-2006.*

Oracle8 Server Concepts, "Privileges and Roles", Release 8.0, vol. 2, Jun. 1997, pp. 25-1 through 25-15.

Bertino, Elisa, et al., "Controlled Access and Dissemination of XML Documents," Proceedings of the second international workshop on Web information and data management (Nov. 1999), pp. 22-27.

Bertino, Elisa, et al. "On Specifying Security Policies for Web Documents with an XML-based Language,", Proceedings of the sixth ACM symposium on Access control models and technologies (May 2001), pp. 57-65.

Bonczek, Robert H., et al. "A Transformational Grammar-Based Query Processor for Access Control in a Planning System," ACM Transactions on Database Systems, (Dec. 1977) pp. 326-338, vol. 2, No. 4.

Castano, Silvana, et al., "A New Approach to Security System Development," Proceedings of the 1994 workshop on New security paradigms (Aug. 1994), pp. 82-88.

Gladney, H.M., "Access Control for Large Collections," ACM Transactions on Information Systems (Apr. 1997), pp. 154-194, vol. 15, No. 2.

Hsiao, David K., "A Software Engineering Experience In The Management, Design and Implementation of a Data Secure System," Proceedings of the $2^{nd}$ international conference on Software engineering (Oct. 1976), pp. 532-538.

Myers, Andrew C. et al., "Protecting Privacy Using the Decentralized Label Model," ACM Transactions on Software Engineering and Methodology (Oct. 2000), pp. 410-442, vol. 9, No. 4.

Sandhu, Ravinderpal Singh, "The Schematic Protection Model: Its Definition and Analysis for Acyclic Attenuating Schemes," Journal of the Association for Computing Machinery (Apr. 1988), pp. 404-432, vol. 35, No. 2.

Sion, Radu, et al., "Rights Protection for Relational Data," Proceedings of the 2003 ACM SIGMOD international conference on Management of data (Jun. 2003) pp. 98-109.

Wedde, Horst F. et al., "Role-Based Access Control in Ambient and Remote Space," Proceedings of the ninth ACM symposium on Access control models and technologies (Jun. 2004) pp. 21-30.

* cited by examiner

METHOD AND SYSTEM FOR MANAGEMENT OF ACCESS INFORMATION

CROSS-REFERENCE TO RELATED APPLICATIONS

The present application claims priority to U.S. Provisional Application No. 60/272,521, filed on Feb. 28, 2001, which is hereby incorporated by reference in its entirety.

The present application is related to the following applications: U.S. Ser. No. 10/084,880, filed on Feb. 27, 2002 entitled "Method and System for Management of Access Information"; U.S. Ser. No. 10/084,881, filed on Feb. 27, 2002 entitled "Method and System for Implementing Current User Links"; and U.S. Ser. No. 10/086,103, filed on Feb. 27, 2002 entitled "Method and System for Implementing Shared Schemas for Users in a Distributed Computer System." The above identified applications are hereby incorporated by reference in their entirety, as if fully set forth herein.

BACKGROUND AND SUMMARY

The invention relates to computer systems, and more particularly, to a method and mechanism for managing and accessing attribute information for users and applications in a distributed computing environment, such as a distributed database environment.

In a distributed computing environment, it is often advantageous to centralize the management of attribute information for users and applications. One approach for centrally managing user information is to maintain this information in a central directory information system (e.g., an LDAP directory). An exemplary system for managing user information using a directory information system is described in U.S. application Ser. No. 10/084,880, filed on Feb. 27, 2002, which is hereby incorporated by reference in its entirety as if fully set forth herein.

When a user connects to a computing system, e.g., a database system, it is often desirable to set up the user's context during initialization based upon the user's identity. One approach to setting up the user's context involves creating a program to manually extract the needed user information from a repository for each user that connects to the system. This manual process is often time-consuming, tedious, and prone to errors. In addition, since each application may need to set up application specific attributes in a non-uniform manner and may access different repositories, the program code may be nonstandard and not reusable; thus, the program may have to be rewritten for each different application. Moreover, this approach presents possible security risks since each user/application that executes the program must be given sufficient authorizations/privileges to access the central repository. This is particularly troubling if any administrators or locations that grant this "trusted status" to a user/application have lower security precautions in place than at other locations.

Accordingly, the present invention provides an improved method and system for centrally managing and accessing attribute information in a distributed computing system. In one embodiment of the invention, applications set up application specific user attributes in an LDAP enabled directory. When an application user connects to a database server, the server automatically accesses the directory to identify the relevant user attributes for that application. These user attributes are stored in the session context. In one embodiment, standard LDAP attributes are also retrieved from the directory and stored in the session context. In one embodiment, the standard LDAP interface can be used to interface with the repository. Because the database server performs the necessary extraction from the repository, security is preserved since only the trusted database performs the actual access of information from the directory. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and mechanism for centralized management of attribute information in a computing system. Specific orderings and combinations of process actions and system components are described herein to illustrate the invention. It will, however, be evident that various modifications and changes may be made without departing from the spirit and scope of the invention. For example, the following explanation of the invention is made with respect to a distributed system comprising database nodes (also referred to as database servers or databases). However, the inventive concepts disclosed herein may be equally applied to other types of computing nodes. Thus, the specification and drawings are to be regarded in an illustrative rather than restrictive sense.

To facilitate the explanation of the present invention, a brief discussion of directory information systems will now be made. A directory in a directory information system can be considered an index to organized information. The directory lists objects, e.g., people and organizations, and gives details about each object. In a computerized environment, a directory is a database that stores collections of information about objects. The information in such a directory might represent any resource that require management—for example, employee names, titles, and security credentials, information about e-commerce partners, or about shared network resources such as conference rooms and printers.

A commonly used directory information system is a directory based on the Lightweight Directory Access Protocol ("LDAP"). LDAP is a directory protocol that was originally developed as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain directory information. Further details of the LDAP directory protocol can be located at the LDAP-devoted website maintained by the University of Michigan. Also found at the University of Michigan website are the following documents (which are hereby incorporated by reference in their entirety): RFC-1777 Lightweight Directory Access Protocol; RFC-1558 A String Representation of LDAP Search Filters; RFC-1778 The String Representation of Standard Attribute Syntaxes; RFC-1779 A String Representation of Distinguished Names; RFC-1798 Connectionless LDAP; RFC-1823 The LDAP Application Program Interface; and, RFC-1959 An LDAP URL Format.

The present invention is described with reference to LDAP directories. LDAP directory systems are normally organized in a hierarchical structure having entries (i.e., objects) organized in the form of a tree, which is referred to as a directory information tree ("DIT"). The DIT is often organized to reflect political, geographic, or organizational boundaries. In an LDAP directory, each collection of information about an object is called an entry. A unique name or ID (which is commonly called a "distinguished name") identifies each LDAP entry in the DIT. An LDAP entry is a collection of one or more entry attributes. Each entry attribute has a "type" and one or more "values." Each entry belongs to one or more object classes. Entries that are members of the same object class share a common composition of possible entry attribute types.

Figure 1:
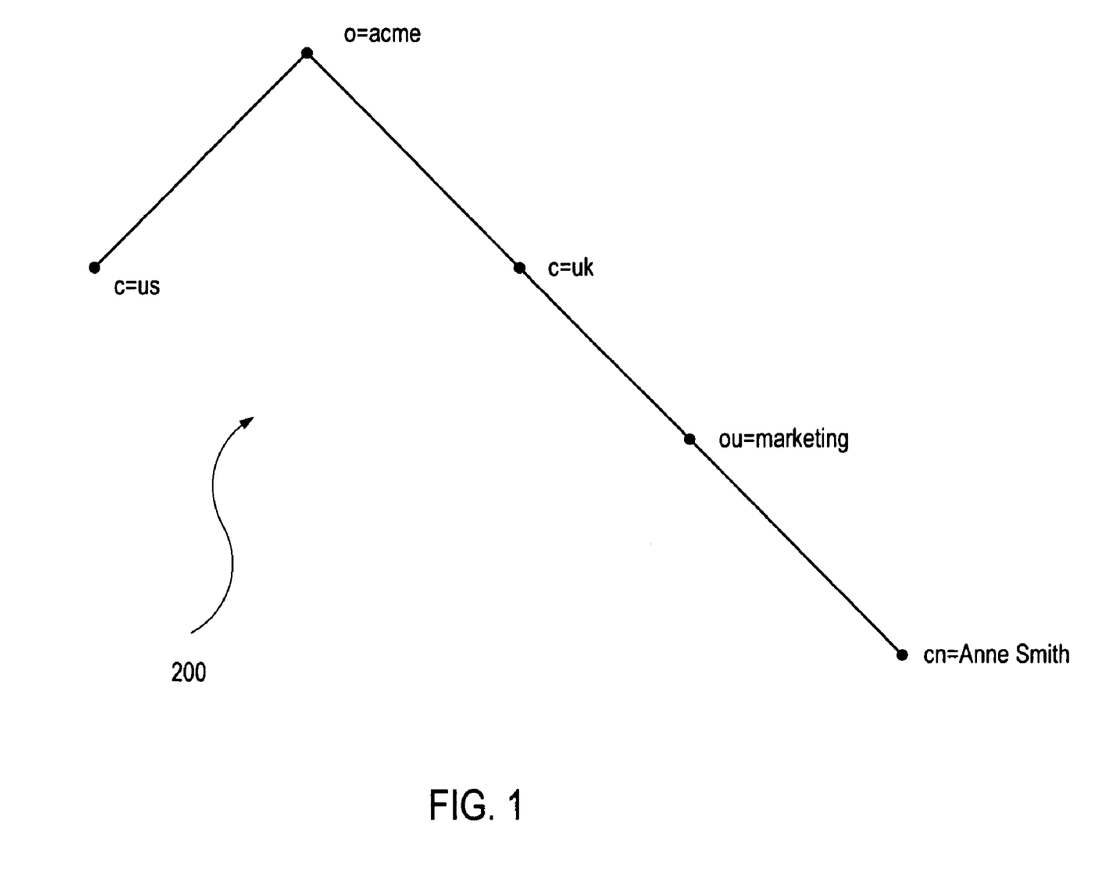
FIG. 1 represents an example directory information tree.

Each entry in an LDAP directory is uniquely identified by a distinguished name (DN). The distinguished name identifies where the entry resides in the directory's hierarchy. The directory hierarchy can often be represented in a tree structure, referred to as a directory information tree (DIT). An example of a DIT 200 is shown in FIG. 1. The DIT 200 in FIG. 1 is structured along geographical and organizational lines. The example DIT 200 uses the following notation to define distinguished name components:

o=organization
c=country
ou=organizational unit
cn=common name

In DIT 200, the branch on the right represents the entry for a person "Anne Smith," who works in the organizational unit (ou) "Marketing", in the country (c) of Great Britain (uk), in the organization (o) Acme. The DN for this Anne Smith entry is:

cn=Anne Smith,ou=Marketing,c=uk,o=acme.

Note that the conventional format of a distinguished name for a LDAP directory starts with the least significant component (that naming the entry itself) and proceeds to the most significant component (that just below the root).

Figure 2:
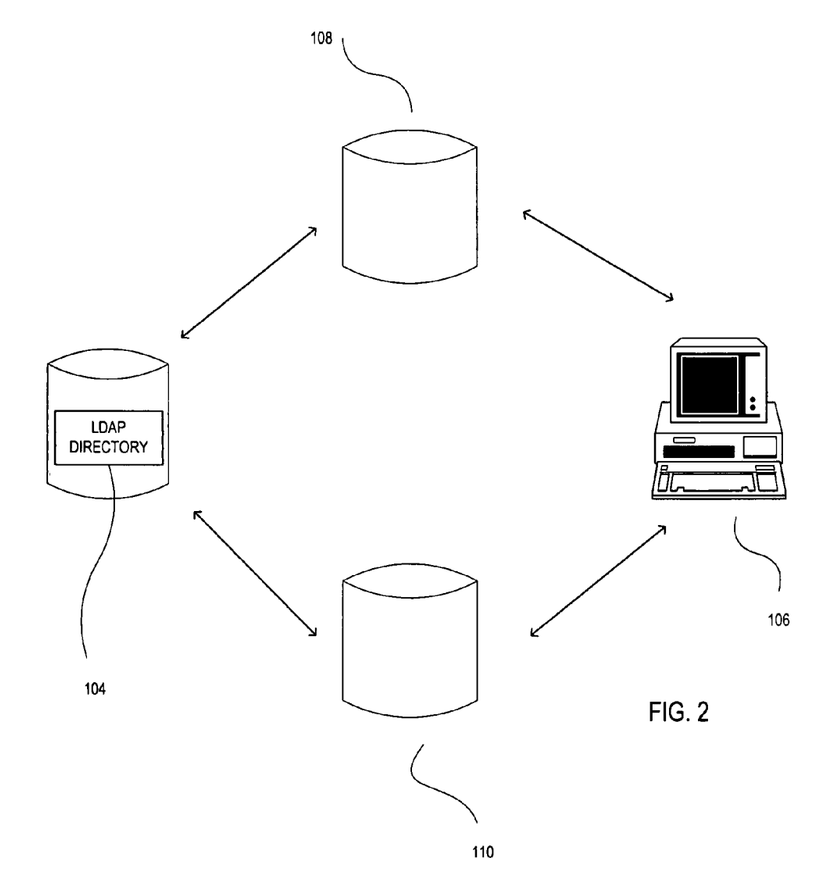
FIG. 2 depicts an architecture for storing user information according to an embodiment of the invention.

FIG. 2 shows a system for managing user and access information according to an embodiment of the invention. User access and privilege information are stored in a centralized directory information system 104, which in an embodiment comprises a LDAP directory. When a user at computer access device 106 seeks to access first database 108 or second database 110, "authentication" information is communicated from access device 106 to the respective database for which access is sought. Authentication refers to the process of verifying that a user is who he claims to be. This may be accomplished, for example, by requiring the user to provide a valid password associated with the user's identification or by supplying a digital certificate that validates the user's identity.

The centralized directory information system 104 maintains current authentication information for authorized users of the computing system. For example, the current password and/or digital certificate validation data for users are stored at the directory information system 104. The centralized directory information system 104 communicates with each database 108 and 110 to authenticate users that seek to access any of the databases serviced by the centralized directory information system 104. Alternatively, user authentication information is stored for verification at each database 108 or 110 for which access is sought or at the client 106.

The directory information system 104 also maintains "authorization" information for each user. Authorization generally refers to the scope of privileges and roles assigned to a given user. Once a user has been successfully authenticated that user's authorization information is sent to the database for which access is sought. The authorization information determines the scope of access that is granted to the user.

Authorization and/or authentication information for users in the distributed computer system can be centrally stored and maintained in the directory information system 104. Hence, each individual database 108 and 110 is not required to locally maintain user account and access information. However, each local database can customize and define the exact amount, level, and scope of access that a user has in the local database based upon the centrally stored user authorization information.

Figure 3:
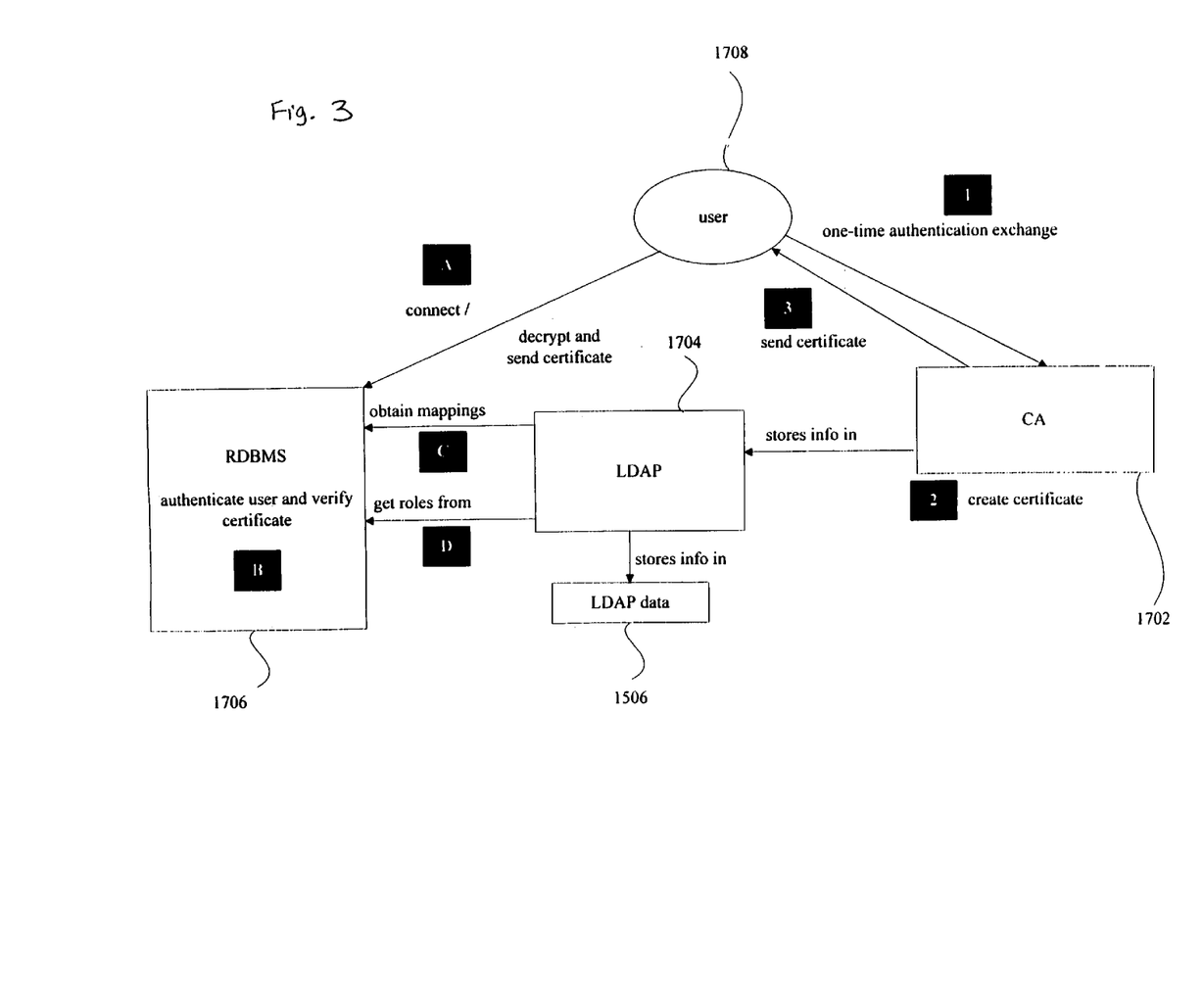
FIG. 3 represents architecture and process flows for integrating RDBMS and a LDAP directory for user access and control, according to an embodiment of the invention.

FIG. 3 depicts a system diagram of an architecture for LDAP authentication according to an embodiment of the invention. In the approach shown in FIG. 3, LDAP data 1506 is stored in a RDBMS 1706. A certificate authority ("CA") 1702 provides certificates for authentication of global users and for mutual authentication between servers. Any suitable CA may be employed in the invention, including CA products available from Microsoft Corporation (Microsoft CA) or Oracle Corporation (OCA). An LDAP directory service 1704 acts as a functional intermediary between the CA 1702 and the LDAP information repository 1506. Any suitable LDAP directory service may be employed in the invention, such as the Oracle Internet Directory (OID) product, available from Oracle Corporation of Redwood Shores, Calif.

Steps 1-3 in FIG. 3 describe the process for generating authentication information or a user 1708. The user 1708 is created as an object at the directory 1704, e.g., with an X.509 compliant username. Then, the user 1708 requests and obtains a certificate from an appropriate CA. When the user 1708 obtains a certificate, that user is preferably authenticated in some out-of-band way (e.g., fingerprint, social security card, etc.). After passing the registration process, a wallet is created on the user's client machine. The wallet includes the repository location, the trustpoints (e.g., the legitimate repository's certificate), and the user's encrypted private key and his certificate. The user's certificate contains the user's ID and public key, and is cryptographically signed by the certificate authority 1702. In an alternate embodiment, the user authentication information can also be stored at the LDAP directory 1704/1506.

The database server 1706 is also registered via the CA 1702 (or Kerberos authority) with an X.509 name at the LDAP directory 1704. The database or DBA obtains a wallet with a certificate as part of this process. Then, there is another login-like exchange via a wallet manager to open a wallet for the server 1706. This wallet contains the server's signed certificate (if certificates are used), trust points, and an encrypted private key. These items will be used in the handshake between the server 1706 and the global user 1708.

Steps A, B, and C in FIG. 3 describe actions that occur when a user 1708 attempts to connect to the database 1706. When the user attempts to connect, the user's signed certificate or Kerberos ticket is retrieved from the user's wallet and is passed, along with the connection information, to the database 1706. At the database 1706, a mutual authentication handshake is performed with the client machine to verify the identity of the user 1708 attempting to connect. As part of this handshake, if certificates are being used, the database 1706 performs a public/private key and certificate exchange with the client, and verifies that the provided certificate is a legitimate certificate signed by the correct CA 1702 by referencing the trustpoints stored in the database's wallet, and optionally validates that the certificate has not been revoked. This step confirms that the public key provided is the correct one for the user listed in the certificate. Similarly, the user's machine verifies and validates the RDBMS's certificate, and authenticates the RDBMS.

During the attach phase, before the actual login, the database 1706 obtains the user identity (e.g., from the certificate, if using certificates), and places it into the network context. At login, the RDBMS extracts the user's external username (e.g., the distinguished name) and public key from the network context. The RDBMS looks up the global user locally and in the directory to find an associated schema name. The database 1706 then retrieves the user's global roles from the LDAP directory. The database 1706 also performs schema mappings for the user 1708.

Figure 4:
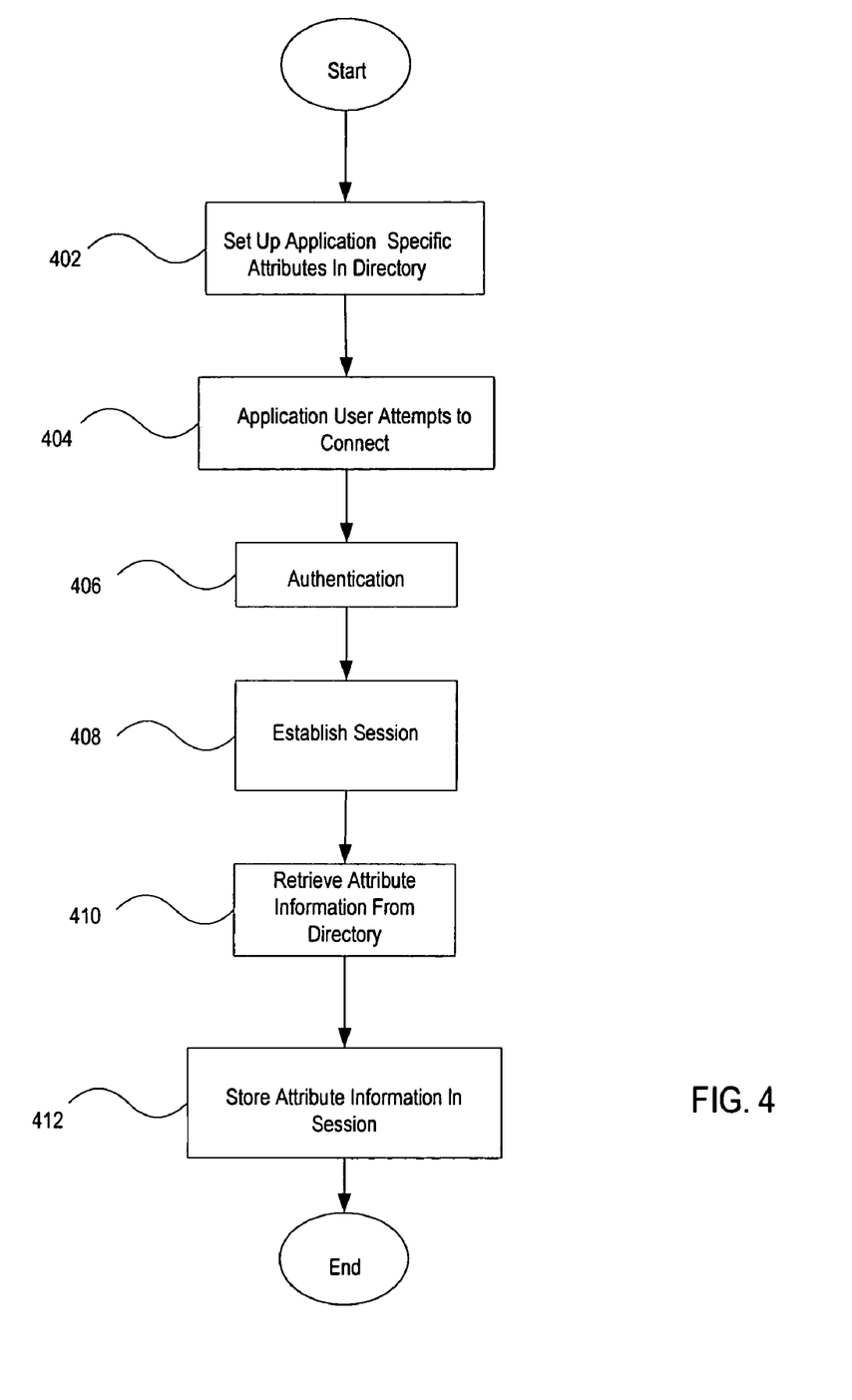
FIG. 4 is a flowchart of a process for managing a centrally initialized context according to an embodiment of the invention.

FIG. 4 is a flowchart of a process for managing a centrally initialized context according to an embodiment of the invention. At step 402, application specific attributes are set up in a directory. In an embodiment, this is accomplished by creating a suitable subtree in the LDAP directory containing user attributes relevant to the application. The exact location of the subtree is not important, so long as an appropriate association is created between the subtree and the application to which it pertains. When a user attribute for the application is added, modified, or deleted, the corresponding subtree for that application's user attributes is correspondingly edited to reflect the change to the affected user attribute.

When an application user attempts to connect to the database server (step 404), authentication procedures perform any necessary security checks (step 406). An example of such authentication procedures was described with respect to FIGS. 2 and 3. When the security check has been successfully completed, a database session is established for the user (step 408).

At steps 410 and 412, the relevant user attribute information for the application is retrieved from the LDAP directory and stored in the user session. In an embodiment, the context for the user session is automatically populated with the attribute information after the session is established by the database server. The attribute information is specific to the particular application and user for which the session is established. Since the database server performs the task of retrieving the attribute information from the LDAP directory, the user/application does not necessarily need to obtain permissions/privileges to directly access the LDAP directory. In one embodiment, this attribute information is maintained and is accessible for the life of the session. In one embodiment, the user attribute information is read-only from LDAP, and any changes to the user attribute are not replicated back to the LDAP directory. In an alternate embodiment, changed user attribute information that is locally initiated within the session can be replicated back to the LDAP directory.

Figure 5:
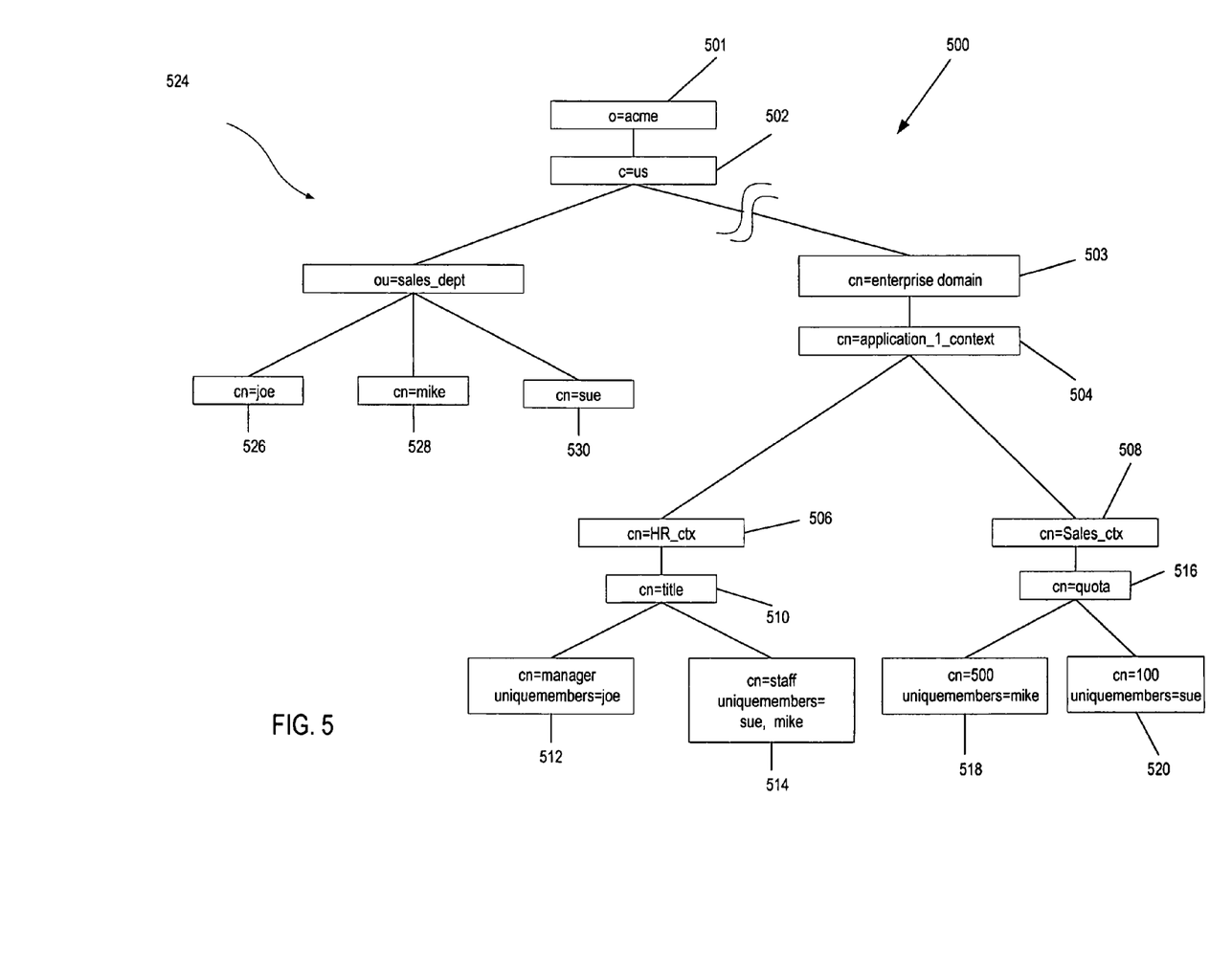
FIG. 5 depicts a specially configured LDAP directory tree according to an embodiment of the invention.
Figure 6:
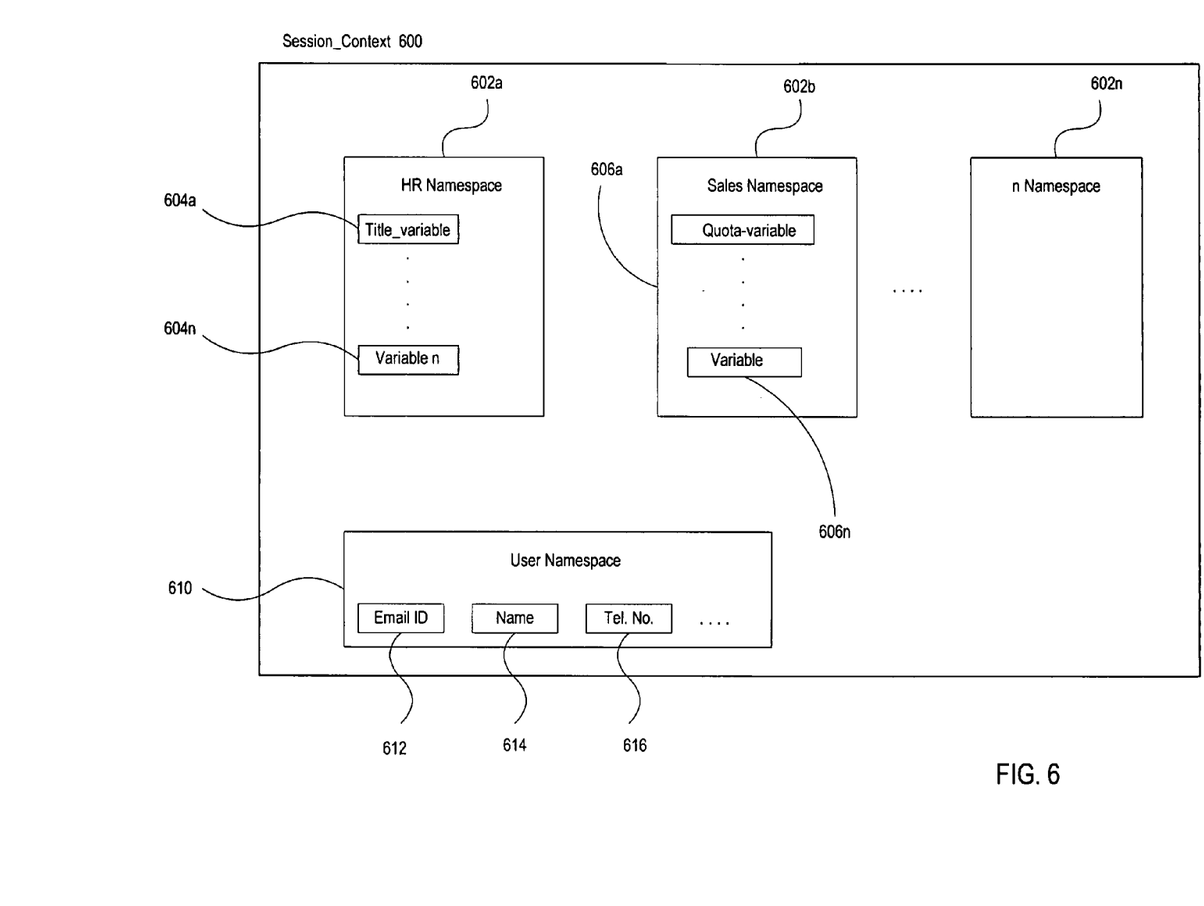
FIG. 6 shows a context for a user session populated with LDAP information according to an embodiment of the invention.

To explain the invention in more detail, reference is now made to FIGS. 5 and 6, which provide an illustrative example of one embodiment of the invention.

FIG. 5 depicts an example LDAP directory tree 500. The left portion 524 of directory tree 500 contains entries relating to users for which information is managed by the LDAP directory. For example, entry 526 contains LDAP user information for the user having a DN of "cnjoe,ou=sales_dept, c=us,o=acme." Similarly, entry 528 contains LDAP user information for the user having a DN of "cn=mike, ou=sales_dept,c=us,o=acme" and entry 530 contains LDAP user information for the user having a DN of "cn=sue, ou=sales_dept,c=us,o=acme."

As noted at step 402 of FIG. 4, application specific attributes can be set up in the LDAP directory by creating a suitable subtree containing user attributes relevant to the application. In the example directory tree of FIG. 5, this is accomplished for a given application ("application 1") by adding the subtree rooted at node 504 (entitled "application_1_context"). Any user attributes relevant to application 1 would be maintained in a suitable structure in the subtree rooted at node 504. Each application that seeks to centrally manage and initialize this type of information would also have a corresponding subtree somewhere in the LDAP directory. The same user attribute information may be relevant to multiple applications, and therefore the same user attribute information may appear in multiple application subtrees. In an alternate embodiment, applications that correspond to the same or similar user attribute information may share the same subtree, or portions of subtrees, in the LDAP directory.

Within the application_1_context subtree, multiple sets of user attribute information can be managed. Each set of related user attribute information is hereby referred to as a "namespace." For example, rooted at node 506 is a first namespace entitled "HR_ctx" and rooted at node 508 is a second namespace entitled "Sales_ctx." In an embodiment, each namespace corresponds to a particular "package" which can permissively access and modify its user attribute contents. For purposes of explanation in this example, a package can be considered a set of functions and procedures that perform certain operations within an application in a database server. Therefore, a namespace will group together the user attribute information that is managed by a particular package.

Each namespace corresponds to zero or more user attributes relevant to that namespace. For example, namespace HR_ctx (rooted at node 506) contains the attribute "Title" (at node 510). In an embodiment, each value for the identified attribute exists as a child node to the attribute node. Thus, node 512 identifies a first possible value "manager" for the Title attribute. Node 514 identifies a second possible value "staff" for the Title attribute.

In an embodiment, each user that corresponds to a particular value is identified in the appropriate node object. Thus, node 512 identifies the user "joe" as an entity that has the "manager" namespace-attribute-value combination with respect to application 1. In other words, the portion of the subtree rooted at node 506 and extending to node 512 identifies user "joe" as having the value "manager" for the "Title" attribute. Similarly, node 514 identifies the users "sue" and "mike" as entities that have the "staff" namespace-attribute-value combination with respect to application 1. In other words, the portion of the subtree rooted at node 506 and extending to node 514 identifies users "sue" and "mike" as having the value "staff" for the "Title" attribute.

The namespace information rooted at node 508 similarly maintains namespace-attribute-value combination with respect to application 1. The portion of the subtree rooted at node 508 and extending to node 518 identifies user "mike" as having an attribute "Quota" with a value of "500" (nodes 516 and 518). The portion of the subtree rooted at node 508 and extending to node 520 identifies user "sue" as having an attribute "Quota" with a value of "100" (nodes 516 and 520).

In FIG. 5, the subtree rooted at node 504 is a child of the enterprise domain node 503. In an embodiment, information for related database servers are managed on a domain basis, in which multiple servers may be grouped within the same enterprise domain to facilitate information management and access. It is noted, however, that the present invention is not to be limited to use in conjunction with enterprise domains, and may be suitably utilized even if enterprise domains are not present.

Once the subtree rooted at node 504 is sufficiently set up in the LDAP directory for the application, any application user that appropriately establishes a session will have the relevant information from the subtree copied and stored in the session context. This can be configured to happen automatically based upon the user's identity. Thus, if user "mike" establishes a session with application 1, then all user attributes relevant for user "mike" can be automatically searched and retrieved from the subtree rooted at node 504 (e.g., nodes 514 and 518) to populate the application context with the appropriate namespace-attribute-value combinations.

FIG. 6 illustrates an example session context 600 according to one embodiment of the invention. Each relevant namespace that appears in the LDAP directory for that application is separately represented within session context 600. Thus, a first namespace 602*a* exists that corresponds to namespace "HR_ctx" rooted at node 506 in LDAP directory 500, a second namespace 602*b* exists that corresponds to namespace "Sales_ctx" rooted at node 508 in LDAP directory 500, and a nth namespace 602*n* exists corresponding to the nth namespace within the appropriate subtree in LDAP directory 500.

In an embodiment, each namespace 602*a*-602*n* in session context 600 includes a separate variable (604*a* to 604*n*, 606*a*-606*n*) for each relevant attribute corresponding to that namespace in LDAP directory 500. The variables within each namespace are populated with the value appropriate for the particular user/application for which the session is established. The process continues until every relevant namespace-attribute-value combination for the user/application session has been identified and stored in the session context.

In an embodiment, only a context that is specially designated to be initialized on a "global" basis will be automatically populated from the central LDAP directory. This allows a conscious determination to be made regarding whether to allow and accept information that is stored at the central repository.

Figure 7:
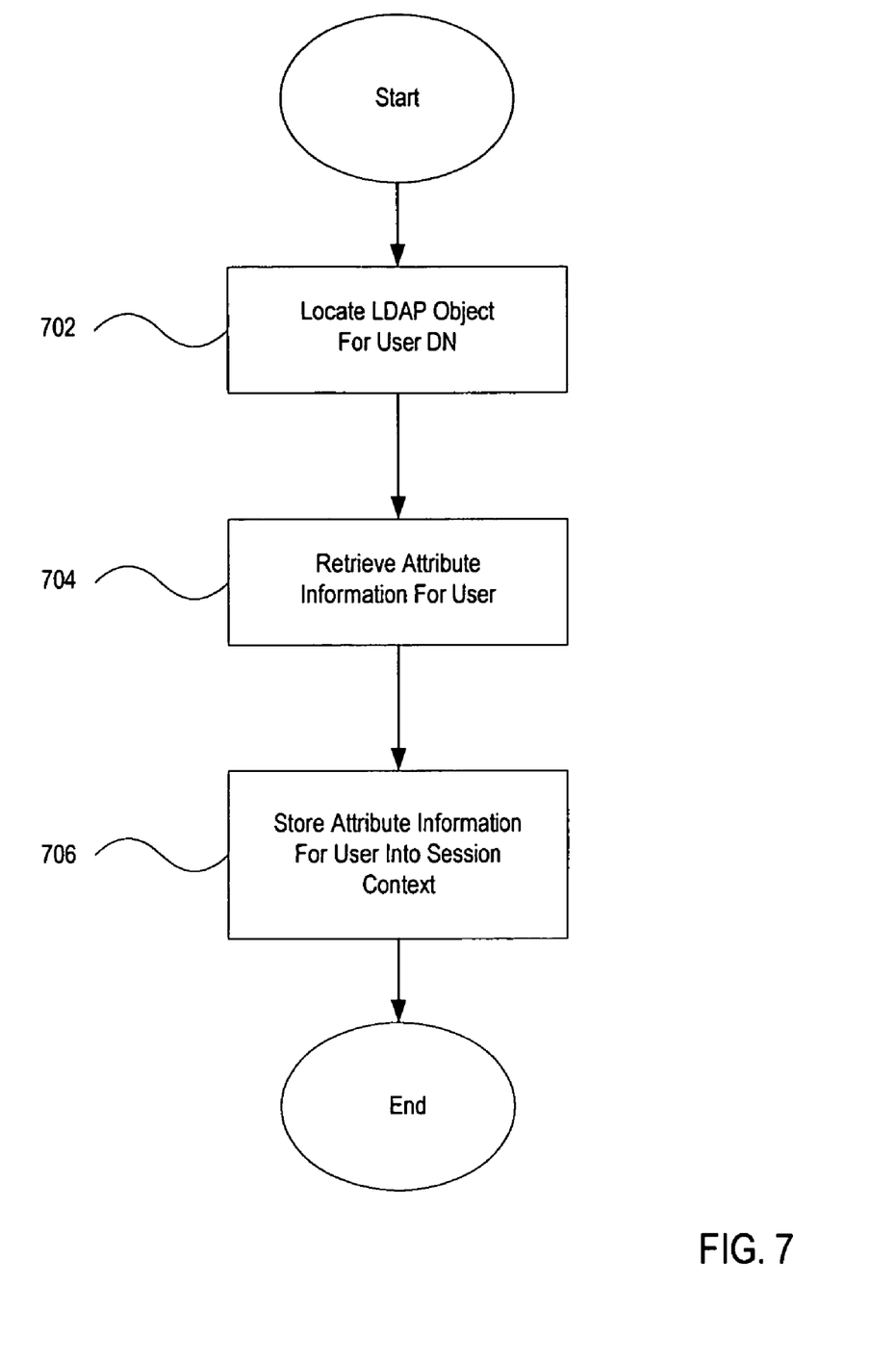
FIG. 7 is a flowchart of a process for storing standard LDAP user attribute information in a context for a user session according to an embodiment of the invention.

FIG. 7 depicts a flowchart of an optimization for the invention, in which standard LDAP attribute information for a user is automatically retrieved from the LDAP directory an stored in the session context. Such standard LDAP attribute information includes, for example, name information, address information, email address information, telephone number, etc. At step 702, the process locates the particular entry in the LDAP directory that corresponds to the DN for the application user. In the illustrative example of FIG. 5, these user entries exist in the portion 524 of the LDAP directory tree 500. For example, if application user "mike" is presently establishing a session, then entry 528 would be identified for this user.

At steps 704 and 706, the LDAP attribute information for the identified user is retrieved from the LDAP directory and stored in the session context. Referring to FIG. 6, a separate user namespace 610 is established in an embodiment to store the LDAP attribute information 612, 614, and 616 for the application user. In an embodiment, this user namespace is configured to be read-only data, which cannot be changed during the user session. In an alternate embodiment, the standard LDAP attribute information can be changed similar to the other namespace data maintained in the session context.

Therefore, described is an improved method and system for managing a centrally initialized context, in which tight integration between the database server, application, and directory allows advantageous management efficiencies and reduction of security risks, which can be implemented using standard LDAP interfaces. Automated access to attribute information can be initiated and used to populate a context, without requiring manual efforts to access user information or reconfigure access programs for the information.

System Architecture Overview

Figure 8:
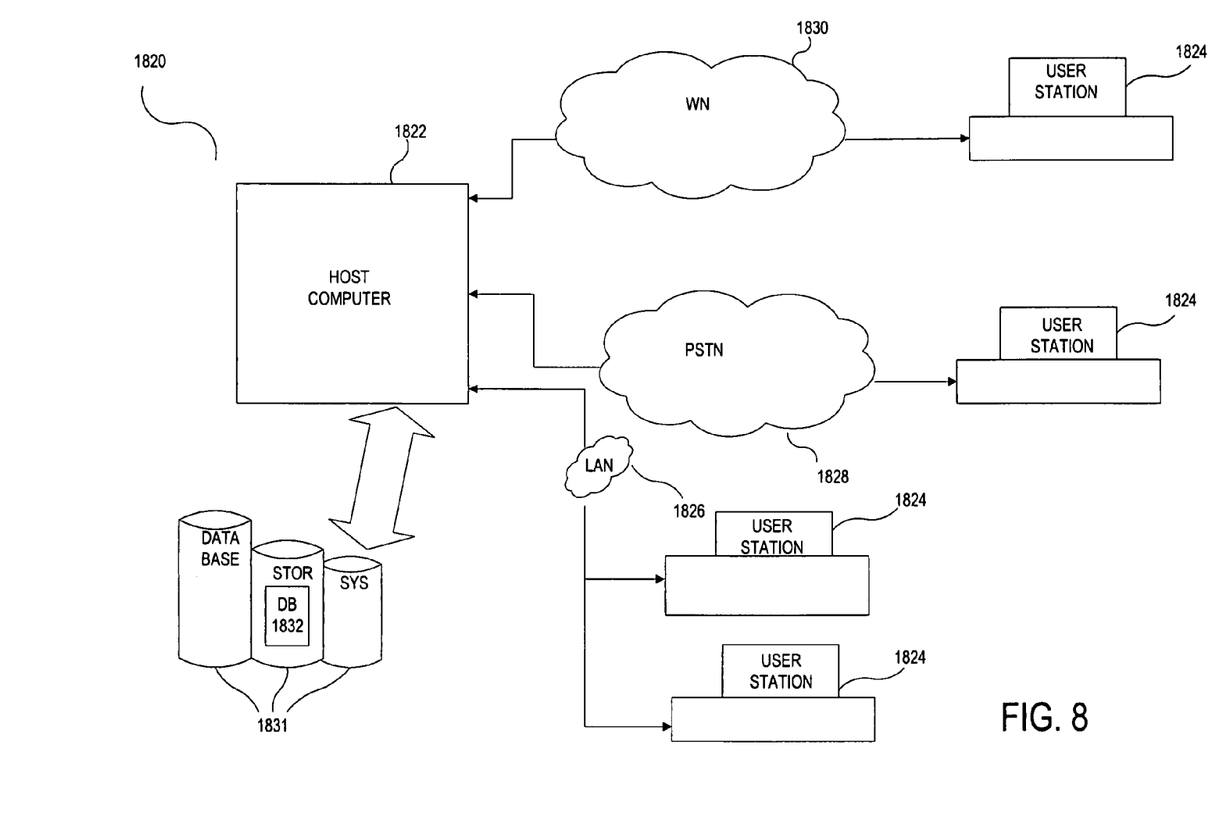
FIGS. 8 and 9 are system architectures that may be employed in an embodiment of the invention.

Referring to FIG. 8, in an embodiment, a computer system 1820 includes a host computer 1822 connected to a plurality of individual user stations 1824. In an embodiment, the user stations 1824 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1824 are connected to the host computer 1822 via a local area network ("LAN") 1826. Other user stations 1824 are remotely connected to the host computer 1822 via a public switched telephone network ("PSTN") 1828 and/or a wireless network 1830.

In an embodiment, the host computer 1822 operates in conjunction with a data storage system 1831, wherein the data storage system 1831 contains a database 1832 that is readily accessible by the host computer 1822. Note that a multiple tier architecture can be employed to connect user stations 1824 to a database 1832, utilizing for example, a middle application tier (not shown). In alternative embodiments, the database 1832 may be resident on the host computer, stored, e.g., in the host computer's ROM, PROM, EPROM, or any other memory chip, and/or its hard disk. In yet alternative embodiments, the database 1832 may be read by the host computer 1822 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 1822 can access two or more databases 1832, stored in a variety of mediums, as previously discussed.

Figure 9:
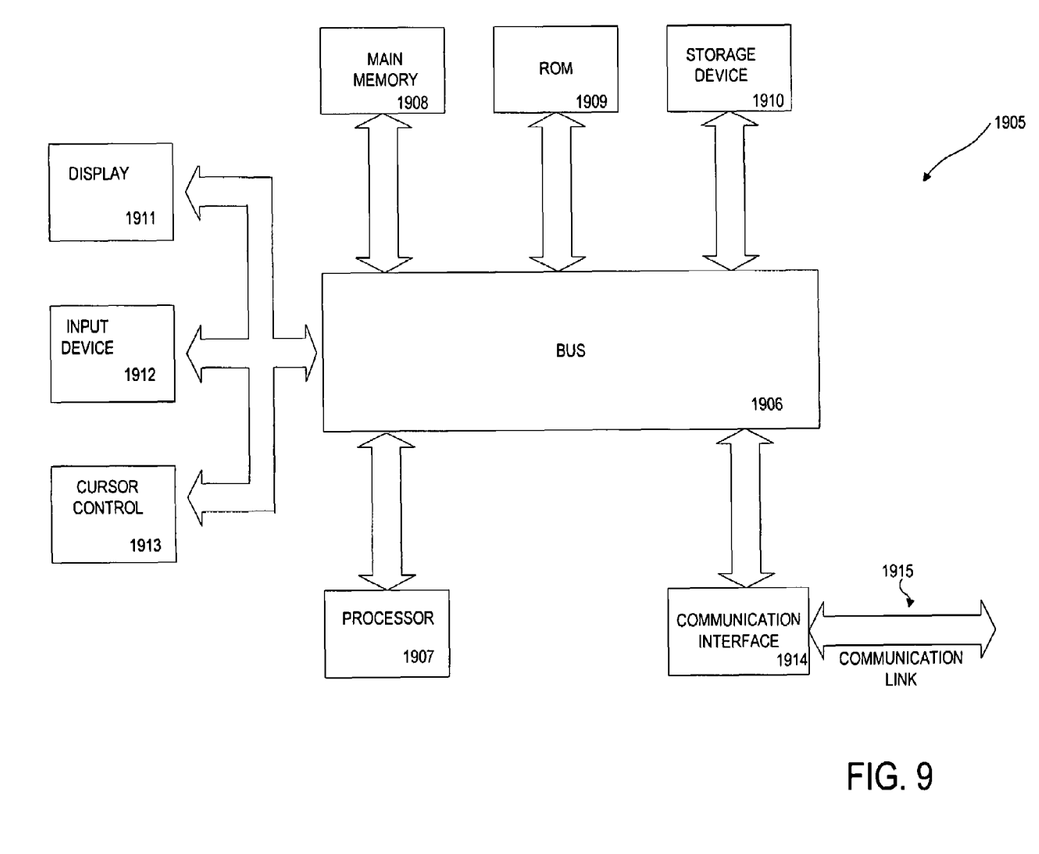

Referring to FIG. 9, in an embodiment, each user station 1824 and the host computer 1822, each referred to generally as a processing unit, embodies a general architecture 1905. A processing unit includes a bus 1906 or other communication mechanism for communicating instructions, messages and data, collectively, information, and one or more processors 1907 coupled with the bus 1906 for processing information. A processing unit also includes a main memory 1908, such as a random access memory (RAM) or other dynamic storage device, coupled to the bus 1906 for storing dynamic data and instructions to be executed by the processor(s) 1907. The main memory 1908 also may be used for storing temporary data, i.e., variables, or other intermediate information during execution of instructions by the processor(s) 1907. A processing unit may further include a read only memory (ROM) 1909 or other static storage device coupled to the bus 1906 for storing static data and instructions for the processor(s) 1907. A storage device 1910, such as a magnetic disk or optical disk, may also be provided and coupled to the bus 1906 for storing data and instructions for the processor(s) 1907.

A processing unit may be coupled via the bus 1906 to a display device 1911, such as, but not limited to, a cathode ray tube (CRT), for displaying information to a user. An input device 1912, including alphanumeric and other columns, is coupled to the bus 1906 for communicating information and command selections to the processor(s) 1907. Another type of user input device may include a cursor control 1913, such as, but not limited to, a mouse, a trackball, a fingerpad, or cursor direction columns, for communicating direction information and command selections to the processor(s) 1907 and for controlling cursor movement on the display 1911.

According to one embodiment of the invention, the individual processing units perform specific operations by their respective processor(s) 1907 executing one or more sequences of one or more instructions contained in the main memory 1908. Such instructions may be read into the main memory 1908 from another computer-usable medium, such as the ROM 1909 or the storage device 1910. Execution of the sequences of instructions contained in the main memory 1908 causes the processor(s) 1907 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1907. Such a medium may take many forms, including, but not limited to, non-volatile, volatile and transmission media. Non-volatile media, i.e., media that can retain information in the absence of power, includes the ROM 1909. Volatile media, i.e., media that can not retain information in the absence of power, includes the main memory 1908. Transmission media includes coaxial cables, copper wire and fiber optics, including the wires that comprise the bus 1906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1907 can retrieve information. Various forms of computer-usable media may be involved in providing one or more sequences of one or more instructions to the processor(s) 1907 for execution. The instructions received by the main memory 1908 may optionally be stored on the storage device 1910, either before or after their execution by the processor(s) 1907.

Each processing unit may also include a communication interface 1914 coupled to the bus 1906. The communication interface 1914 provides two-way communication between the respective user stations 1924 and the host computer 1922. The communication interface 1914 of a respective processing unit transmits and receives electrical, electromagnetic or optical signals that include data streams representing various types of information, including instructions, messages and data. A communication link 1915 links a respective user station 1924 and a host computer 1922. The communication link 1915 may be a LAN 1826, in which case the communication interface 1914 may be a LAN card. Alternatively, the communication link 1915 may be a PSTN 1828, in which case the communication interface 1914 may be an integrated services digital network (ISDN) card or a modem. Also, as a further alternative, the communication link 1915 may be a wireless network 1830. A processing unit may transmit and receive messages, data, and instructions, including program, i.e., application, code, through its respective communication link 1915 and communication interface 1914. Received program code may be executed by the respective processor(s) 1907 as it is received, and/or stored in the storage device 1910, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for managing attribute information, the method comprising:
   a) configuring an application-specific attribute in a directory, wherein the application-specific attribute is configured in the directory to be associated with an identity of an application, the application-specific attribute being an attribute corresponding specifically to the application;
   b) receiving an indication of authentication of an application user and upon receipt of the indication of the authentication of the application user, establishing a session for the application user;
   c) upon establishing the session, automatically retrieving the application-specific attribute from the directory based upon the identity of the application; and
   d) storing the application-specific attribute in a centrally initialized context of the session, wherein the application accesses the application-specific attribute in the session.

2. The method of claim 1 in which the act of configuring the application-specific attribute in the directory comprises:
   configuring a subtree in the directory, the subtree comprising attribute information for the application-specific attribute.

3. The method of claim 2 in which the subtree comprises a child subtree for a grouped set of application-specific attributes.

4. The method of claim 3 in which the child subtree comprises a child node for the application-specific attribute.

5. The method of claim 4 in which the child node corresponds to an attribute value node that corresponds to the application user.

6. The method of claim 3 in which the child subtree is accessible only by a related database package.

7. The method of claim 3 in which the child subtree corresponds to a namespace in the context.

8. The method of claim 7 in which the namespace in the context comprises a variable corresponding to the application-specific attribute.

9. The method of claim 2 in which the subtree is shared among a plurality of applications.

10. The method of claim 1 in which the act of automatically retrieving the application-specific attribute from the directory based upon identity of the application is performed by a database server.

11. The method of claim 1 in which the directory is an LDAP-compatible directory.

12. The method of claim 1 further comprising:
retrieving a standard directory user-attribute from the directory for the application user; and
storing the standard directory user attribute in the context.

13. A computer program product that includes a medium usable by a processor, the medium having stored thereon a sequence of instructions which, when executed by said processor, causes said processor to execute a process for managing user attribute information, the process comprising:
a) configuring an application-specific attribute in a directory, wherein the application-specific attribute is configured in the directory to be associated with an identity of an application, the application-specific attribute being an attribute corresponding specifically to the application;
b) receiving an indication of authentication of an application user and upon receipt of the indication of the authentication of the application user, establishing a session for the application user;
c) upon establishing the session, automatically retrieving the application-specific attribute from the directory based upon the identity of the application; and
d) storing the application-specific attribute in a centrally initialized context of the session, wherein the application accesses the application-specific attribute in the session.

14. The computer program product of claim 13 in which the act of configuring the application-specific attribute in the directory comprises:
configuring a subtree in the directory, the subtree comprising attribute information for the application-specific attribute.

15. The computer program product of claim 14 in which the subtree comprises a child subtree for a grouped set of application-specific attributes.

16. The computer program product of claim 15 in which the child subtree comprises a child node for the application-specific attribute.

17. The computer program product of claim 16 in which the child node corresponds to an attribute value node that corresponds to the application user.

18. The computer program product of claim 15 in which the child subtree is accessible only by a related database package.

19. The computer program product of claim 15 in which the child subtree corresponds to a namespace in the context.

20. The computer program product of claim 19 in which the namespace in the context comprises a variable corresponding to the application-specific attribute.

21. The computer program product of claim 14 in which the subtree is shared among a plurality of applications.

22. The computer program product of claim 13 in which the act of automatically retrieving the application-specific attribute from the directory based upon identity of the application is performed by a database server.

23. The computer program product of claim 13 in which the directory is an LDAP-compatible directory.

24. The computer program product of claim 13 further comprising:
retrieving a standard directory user attribute from the directory for the application user; and
storing the standard directory user attribute in the context.

25. A system for managing user attribute information, comprising:
a) means for configuring an application-specific attribute in a directory, wherein the application-specific attribute is configured in the directory to be associated with an identity of an application, the application-specific attribute being an attribute corresponding specifically to the application;
b) means for receiving an indication of authentication of an application user and upon receipt of the indication of the authentication of the application user, means for establishing a session for the application user;
c) upon establishing the session, means for automatically retrieving the application-specific attribute from the directory based upon the identity of the application; and
d) means for storing the application-specific attribute in a centrally initialized context of the session, wherein the application accesses the application-specific attribute in the session.

26. The system of claim 25 in which the means for configuring the application-specific attribute in the directory comprises:
means for configuring a subtree in the directory, the subtree comprising attribute information for the application-specific attribute.

27. The system of claim 26 in which the subtree comprises a child subtree for a grouped set of application-specific attributes.

28. The system of claim 27 in which the subtree comprises a child node for the application-specific attribute.

29. The system of claim 28 in which the child node corresponds to an attribute value node that corresponds to the application user.

30. The system of claim 27 in which the child subtree is accessible only by a related database package.

31. The system of claim 27 in which the child subtree corresponds to a namespace in the context.

32. The system of claim 31 in which the namespace in the context comprises a variable corresponding to the application-specific attribute.

33. The system of claim 26 in which the subtree is shared among a plurality of applications.

34. The system of claim 25 in which the means for automatically retrieving the application-specific user attribute from the directory based upon identity of the application is performed by database server means.

35. The system of claim 25 in which the directory is an LDAP-compatible directory.

36. The system of claim 25 further comprising:
means for retrieving a standard directory user attribute from the directory for the application user; and
means for storing the standard directory user attribute in the context.

37. The method of claim 1, wherein the stored application-specific attribute is available to the application while the session is open.

38. The method of claim 1, wherein neither the application nor the application user access the application-specific attribute in the directory.

39. The method of claim 1, wherein the application accesses the application-specific attribute from the session context.

40. The method of claim 39, wherein the application accesses the application-specific attribute without using LDAP.

41. The computer program product of claim 13, wherein the stored application-specific attribute is available to the application while the session is open.

42. The computer program product of claim 13, wherein neither the application nor the application user access the application-specific attribute in the directory.

43. The computer program product of claim 13, wherein the application accesses the application-specific attribute from the session context.

44. The method of claim 43, wherein the application accesses the application-specific attribute without using LDAP.

45. The system of claim 25, wherein the stored application-specific attribute is available to the application while the session is open.

46. The system of claim 25, wherein neither the application nor the application user access the application-specific attribute in the directory.

47. The system of claim 25, wherein the application accesses the application-specific attribute from the session context.

48. The method of claim 47, wherein the application accesses the application-specific attribute without using LDAP.

49. The method of claim 4 in which the child node corresponds to an attribute value node that corresponds to the application.

50. The computer program product of claim 16 in which the child node corresponds to an attribute value node that corresponds to the application.

51. The system of claim 28 in which the child node corresponds to an attribute value node that corresponds to the application.

* * * * *

UNITED STATES PATENT AND TRADEMARK OFFICE
CERTIFICATE OF CORRECTION

PATENT NO. : 7,440,962 B1 Page 1 of 1
APPLICATION NO. : 09/974085
DATED : October 21, 2008
INVENTOR(S) : Wong et al.

It is certified that error appears in the above-identified patent and that said Letters Patent is hereby corrected as shown below:

In column 11, line 13, in claim 12, delete "user-attribute" and insert -- user attribute --, therefor.

Signed and Sealed this

Thirteenth Day of April, 2010

David J. Kappos
*Director of the United States Patent and Trademark Office*